United States Patent
Sohn et al.

(10) Patent No.: US 11,371,839 B2
(45) Date of Patent: Jun. 28, 2022

(54) METHOD OF PERFORMING VISUALIZED MEASUREMENT ON THICKNESS DISTRIBUTION OF PAINT FILM AND APPARATUS THEREFOR

(71) Applicant: Korea Advanced Institute of Science and Technology, Daejeon (KR)

(72) Inventors: Hoon Sohn, Daejeon (KR); Soonkyu Hwang, Daejeon (KR); Jiho Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 874 days.

(21) Appl. No.: 16/307,640

(22) PCT Filed: Nov. 2, 2018

(86) PCT No.: PCT/KR2018/013234
§ 371 (c)(1),
(2) Date: Dec. 6, 2018

(87) PCT Pub. No.: WO2019/103348
PCT Pub. Date: May 31, 2019

(65) Prior Publication Data
US 2021/0223037 A1   Jul. 22, 2021

(30) Foreign Application Priority Data
Nov. 24, 2017   (KR) .................. 10-2017-0158460

(51) Int. Cl.
*G01B 21/08*   (2006.01)
*G06T 5/00*   (2006.01)
*G06T 7/00*   (2017.01)

(52) U.S. Cl.
CPC ............ *G01B 21/085* (2013.01); *G06T 5/002* (2013.01); *G06T 7/0004* (2013.01);
(Continued)

(58) Field of Classification Search
CPC ... G03B 17/561; G03B 15/03; B05B 11/1005; B05C 1/0826
See application file for complete search history.

(56) References Cited

U.S. PATENT DOCUMENTS 6,096,132 A * 8/2000 Kaiba .................... B05B 12/00
                                                        118/712
8,520,223 B2 * 8/2013 Bucher .................. G01B 11/24
                                                         356/630

(Continued)

FOREIGN PATENT DOCUMENTS

| CN | 103644854 A | 3/2014 |
| JP | 2004-212193 A | 7/2004 |

(Continued)

OTHER PUBLICATIONS

Chinese First Office Action (with Machine English Translation from Espacenet.com) dated Jul. 24, 2020 for Chinese Application No. 201880003344.4; 14 Pages.

(Continued)

*Primary Examiner* — Yosef Kassa
(74) *Attorney, Agent, or Firm* — Daly Crowley Mofford & Durkee, LLP

(57) ABSTRACT

A method of performing visualized measurement on thickness distribution of a paint film and an apparatus therefor. A measurement target region is heated by a heating unit that applies a light beam while moving relative to the measurement target region of a measurement target structure. A sensing unit moving together with the heating unit generates a plurality of thermal images related to a phenomenon in which thermal energy is propagated in the measurement target region by scanning and photographing the heated measurement target region. The thermal images in a dynamic state are converted into time-spatial-integrated thermal images in a static state by performing coordinate (Continued)

transformation according to a time-spatial-integrated coordinate transformation algorithm. A thickness of the paint film is calculated by using a Fourier thermal conduction equation. A noise caused by an external heat source is removed by subtracting a pre-heating time-spatial-integrated thermal image from the converted time-spatial-integrated thermal image.

24 Claims, 10 Drawing Sheets

(52) U.S. Cl.
CPC .............. *G06T 2207/10048* (2013.01); *G06T 2207/20032* (2013.01); *G06T 2207/30108* (2013.01)

(56) References Cited

U.S. PATENT DOCUMENTS

| | | | |
|---|---|---|---|
| 9,157,800 B2* | 10/2015 | Priore | ................ G01J 3/32 |
| 9,689,796 B2* | 6/2017 | Van Mechelen | ... G01N 21/3581 |
| 2007/0229810 A1* | 10/2007 | Kaya | ................ G01N 21/57 |
| | | | 356/237.2 |
| 2010/0192852 A1* | 8/2010 | Walcot | ................ F04C 13/002 |
| | | | 118/668 |

FOREIGN PATENT DOCUMENTS

| | | |
|---|---|---|
| KR | 10-2002-0035105 A | 5/2002 |
| KR | 10-1320358 B1 | 10/2013 |
| KR | 10-2015-0088206 A | 7/2015 |
| KR | 10-2017-0126725 A | 11/2017 |

OTHER PUBLICATIONS

PCT International Search Report dated Feb. 22, 2019 for International Application No. PCT/KR2018/013234; 3 Pages.

* cited by examiner (A)

(B)

METHOD OF PERFORMING VISUALIZED MEASUREMENT ON THICKNESS DISTRIBUTION OF PAINT FILM AND APPARATUS THEREFOR

CROSS-REFERENCE TO RELATED APPLICATION

This application is a U.S. National Stage Application of International application No. PCT/KR2018/013234 filed on Nov. 2, 2018. This U.S. non-provisional application claims priorities under 35 USC § 119 from Korean Patent Application No. 10-2017-0158460 filed on Nov. 24, 2017 in the Korean Intellectual Property Office (KIPO), the disclosures of which are hereby incorporated by reference in their entirety.

BACKGROUND

1. Technical Field

The present invention relates to a technical field for measuring a thickness of a paint film applied to a structure, and more particularly, to a technique for visualizing and quantifying thickness distribution of a paint film through heat wave analysis.

2. Description of the Related Art

Most steel structures may be shielded from various external influences such as humidity, direct sunlight, and sea water by a paint film, that is, a paint layer. However, if a paint film having a suitable thickness is not applied to a steel material, the steel material may be corroded or may have a reduced sectional area due to the various external influences described above. The load carrying capacity of the structure using the corroded steel material is lowered. Structures with severe corrosion may not perform their design-intended original roles. Conversely, if a thickness of the paint film is too thick, it is economically disadvantageous due to excessive paint usage.

The biggest difficulty in measuring the thickness of the paint film is that the thickness of the paint film may not be recognized with a naked eye. The paint film thickness inspection target may be, for example, large steel structures such as a steel structure used in a bridge, a vessel structure, etc. There is no choice but to measure a paint film thickness of the large steel structure through a special device suitable for the measurement. However, most of paint film thickness measurement devices which have been developed until now are contact-type inspection devices, or have a limitation in that only a paint film thickness at a specific point can be inspected while 'paint film thickness distribution' over a wide area cannot be inspected. In order to obtain the paint film thickness distribution over a wide area with a conventional paint film thickness inspection device, an inspection method of directly measuring paint film thicknesses at various points in an entire inspection target region and estimating paint film thicknesses at the remaining points based on direct measurement results is used. Therefore, the conventional inspection device has problems such as inconvenience and inefficiency of spot measurement works, and inaccuracy of measurement due to the estimation.

In order to improve the inconvenience of contact-type paint film measurement, a technology for measuring the paint film thickness by analyzing propagation tendencies of terahertz waves (see U.S. Patent Application Publication No. 2010-0195090 A1, "Device for Measuring Thickness of Paint Film in Non-contacting Manner"). However, terahertz waves may not be propagated in materials that contain metallic materials by default. Therefore, a measurement device proposed by the above technology cannot measure a thickness of a paint film containing a metallic material. In addition, the above technology cannot visualize the paint film thickness distribution over a wide area.

SUMMARY

To solve the problems described above, one object of the present invention is to provide a method of visualizing and quantifying thickness distribution of a paint film by a non-contact manner through analysis of heat waves recorded on a plurality of thermal images of the paint film coated on a structure, and an apparatus therefor.

Another object of the present invention is to provide a method of minimizing paint film thickness inspection errors caused by an external noise heat source and surface reflection, and an apparatus therefor.

Still another object of the present invention is to provide a method of visualizing the thickness distribution of the paint film through thermal image correction in consideration of physical properties of paint, and measuring a thickness of the paint film based on the visualized thickness distribution, and an apparatus therefor.

Yet another object of the present invention is to provide a method of visualizing the thickness of the paint film applied to a structure having various shapes including a curved portion by using an optical component, and an apparatus therefor.

Still yet another object of the present invention is to provide a method of widening an inspection region by using a linear laser beam for the purpose of increasing an inspection speed and correcting temperature unhomogeneity caused by the linear laser beam, and an apparatus therefor.

Objects of the present invention are not limited to the above-described ones, and may be variously expanded without departing from the spirit and scope of the present invention.

According to embodiments for achieving the objects of the present invention, there is provided a method of performing visualized measurement on thickness distribution of a paint film, which is used for measuring a thickness of the paint film of a measurement target structure coated with paint. The method includes heating a measurement target region by a heating unit that applies a light beam while moving relative to the measurement target region of the measurement target structure. In addition, the method of performing the visualized measurement on the thickness distribution of the paint film includes generating, by a sensing unit moving together with the heating unit, a plurality of thermal images related to a phenomenon in which thermal energy is propagated in the measurement target region by scanning and photographing the heated measurement target region; and converting the thermal images in a dynamic state into time-spatial-integrated thermal images in a static state by performing coordinate transformation according to a time-spatial-integrated coordinate transformation (TSICT) algorithm.

According to embodiments, the method may further include measuring a thickness of the paint film by using the time-spatial-integrated thermal images based on a phenomenon that a propagation time at which the thermal energy caused by the light beam passes through the paint film varies according to the thickness of the paint film.

According to embodiments, the TSICT algorithm may perform time-spatial-integrated coordinate transformation by applying x*=tv, y*=y, and t*=x/v. Here, x and y respectively denote an x-axis and a y-axis in the thermal images, and t denotes a time. x* and y* respectively denote an x-axis and a y-axis in the time-spatial-integrated thermal images, and t* denotes a thermal wave propagation time. v denotes a relative velocity between the measurement target structure and the sensing unit.

According to embodiments, a value of the thermal wave propagation time t* may be determined such that a time point at which maximum average temperature distribution is realized in the time-spatial-integrated thermal images comes to be equal to a time at which the thermal energy reflected from an interface between the structure and the paint film reaches a surface of the measurement target structure.

According to embodiments, a thickness of the paint film may be calculated by using a Fourier thermal conduction equation L=Q/kAΔTt*. Here, ΔT denotes a temperature increment of the paint film caused by the applied light beam, k denotes thermal conductivity of the paint film, L denotes the thickness of the paint film, Q denotes the thermal energy applied to the measurement target structure, A denotes a sectional area through which the thermal energy is propagated, and t* denotes a thermal wave propagation time.

According to embodiments, the method may further include generating a pre-heating time-spatial-integrated thermal image of the measurement target region by performing the generating step and the converting step on the measurement target structure before applying the light beam to the measurement target structure; and generating a corrected time-spatial-integrated thermal image from which a noise component caused by an external noisy heat source is removed by subtracting the pre-heating time-spatial-integrated thermal image from the time-spatial-integrated thermal image generated by the converting step. The heating step may include applying a linear light beam to the measurement target region by converting an arbitrary light beam into the linear light beam, and the method may further include removing an image noise which causes abnormal temperature distribution by dividing each longitudinal axis (y-axis) data in the corrected time-spatial-integrated thermal images by a non-uniform energy distribution profile of the linear light beam.

According to embodiments, the heating step may include applying a linear light beam to the measurement target region by converting an arbitrary light beam into the linear light beam.

According to embodiments, the method may further include removing an image noise which causes abnormal temperature distribution by dividing each longitudinal axis (y-axis) data in the time-spatial-integrated thermal image, which is generated in the converting step, by a non-uniform energy distribution profile of the linear light beam.

According to embodiments, the method may further include removing a random pepper noise component generated in a heat wave photographing unit of the sensing unit by performing median filtering with a median filtering mask on the time-spatial-integrated thermal image generated in the converting step.

According to embodiments, the method may further include generating normalized pixel data based on a gray scale by converting a color of the paint into the gray scale and dividing each pixel data value of the time-spatial-integrated thermal images generated in the converting step by the gray scale.

According to embodiments, the method may further include generating normalized pixel data based on thermal conductivity of the paint by dividing each pixel data value of the time-spatial-integrated thermal image generated in the converting step by the thermal conductivity of the paint.

According to embodiments, the method may be applicable to both a wet paint film where the paint film is not dried and a dry paint film where the paint film is dried.

According to embodiments, the heating step and the generating step may be performed while a drone flies in parallel with the measurement target region of the measurement target structure in a state in which at least the heating unit and the sensing unit are combined into a single body and mounted on the drone.

Meanwhile, according to embodiments for achieving the objects of the present invention, there is provided an apparatus for performing visualized measurement on a thickness of a paint film of a structure coated with paint (hereinafter referred to as "measurement target structure"). The apparatus include a heating unit configured to generate a light beam to apply thermal energy to a measurement target region of the measurement target structure while moving relative to the measurement target structure; a sensing unit configured to generate a plurality of thermal images related to a phenomenon in which the thermal energy is propagated by photographing the measurement target region of the measurement target structure to which the thermal energy is applied while moving together with the heating unit; and a control unit configured to perform a function of controlling a heating operation of the heating unit and a photographing operation of the sensing unit and receiving the thermal images from the sensing unit to store the thermal images, and a function of converting the thermal images in a dynamic state into time-spatial-integrated thermal images in a static state by performing coordinate transformation based on a time-spatial-integrated coordinate transformation (TSICT) algorithm.

According to embodiments, the heating unit may include: a laser generator configured to continuously generate a laser beam; a line beam generator configured to convert a point laser beam generated by the laser generator into a linear laser beam; and a first focusing lens configured to adjust a focal point such that a length of the linear laser beam emitted from the line beam generator is adapted to a width of the measurement target region.

According to embodiments, the heating unit may include: a lamp light source unit configured to convert electric energy into light energy; a light linearization unit configured to collect light generated by the lamp light source unit to convert the light such that linear light is outputted; and a first focusing lens configured to adjust a focal point such that a length of the linear light emitted from the light linearization unit is adapted to a width of the measurement target region.

According to embodiments, the sensing unit may include: a heat wave photographing unit photograph a measurement target to generate a thermal image corresponding to thermal distribution in the measurement target region; and a second focusing lens configured to adjust a focal point of the heat wave photographing unit such that the heat wave photographing unit precisely focuses on the measurement target region. The heat wave photographing unit may be any one of a thermal imaging camera and a hyperspectral camera.

According to embodiments, the apparatus may measure a thickness of the paint film by using a thermal image in which thermal energy distribution characteristics in the measurement target region of the measurement target structure are recorded based on a phenomenon that a propagation time at which the thermal energy passes through the paint film varies according to the thickness of the paint film.

According to embodiments, a thickness of the paint film may be calculated by using a Fourier thermal conduction equation L=Q/kAΔTt*. Here, ΔT denotes a temperature increment of the paint film caused by an applied light beam, k denotes thermal conductivity of the paint film, L denotes the thickness of the paint film, Q denotes the thermal energy applied to the measurement target structure, A denotes a sectional area through which the thermal energy is propagated, and t* denotes a thermal wave propagation time.

According to embodiments, the control unit may be configured to further perform a function of controlling to photograph the measurement target region of the measurement target structure before applying the light beam to the measurement target structure and to generate a pre-heating time-spatial-integrated thermal image of the measurement target region by converting a plurality of thermal images in a dynamic state, which are generated by the photographing, into time-spatial-integrated thermal images in a static state, and a function of generating a corrected time-spatial-integrated thermal image from which a noise component caused by an external noisy heat source is removed by subtracting the pre-heating time-spatial-integrated thermal image from the converted time-spatial-integrated thermal image in the static state.

According to embodiments, the light beam may be a linear light beam, and the control unit may be configured to further perform a function of removing an image noise which causes abnormal temperature distribution by dividing each longitudinal axis (y-axis) data in the corrected time-spatial-integrated thermal images by a non-uniform energy distribution profile of the linear light beam.

According to embodiments, the apparatus may further include a drone equipped with at least the heating unit and the sensing unit and configured to approach the measurement target region of the measurement target structure and fly in parallel with the measurement target region.

The present invention utilizes an active thermal imaging technique, which can visualize and quantify the paint film thickness distribution by measuring and analyzing the heat waves in an inspection target structure.

According to embodiments of the present invention, paint film thickness inspection can be performed in a non-contact manner. Accordingly, an economic loss due to unnecessary inspection can be reduced, thereby improving productivity.

According to embodiments of the present invention, the paint film thickness distribution over a wide area can be visualized with high accuracy by single measurement. Through the visualization of the paint film thickness distribution, efficiency of structure management and the productivity can be improved.

According to embodiments of the present invention, the measurement can be performed when the inspection target structure is a metal material as well as a non-metal material. In addition, the thickness of the paint film can be visualized in real time, and the thickness distribution of the wet paint film and the dry paint film can be simultaneously measured. Technologies that can provide such functions have not been developed yet.

The present invention can provide visualization and quantification information of the thickness distribution of the paint film without user and expert intervention through automated inspection methods and apparatuses. An inspection apparatus according to the present invention can be applied to, for example, an unmanned aerial vehicle.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
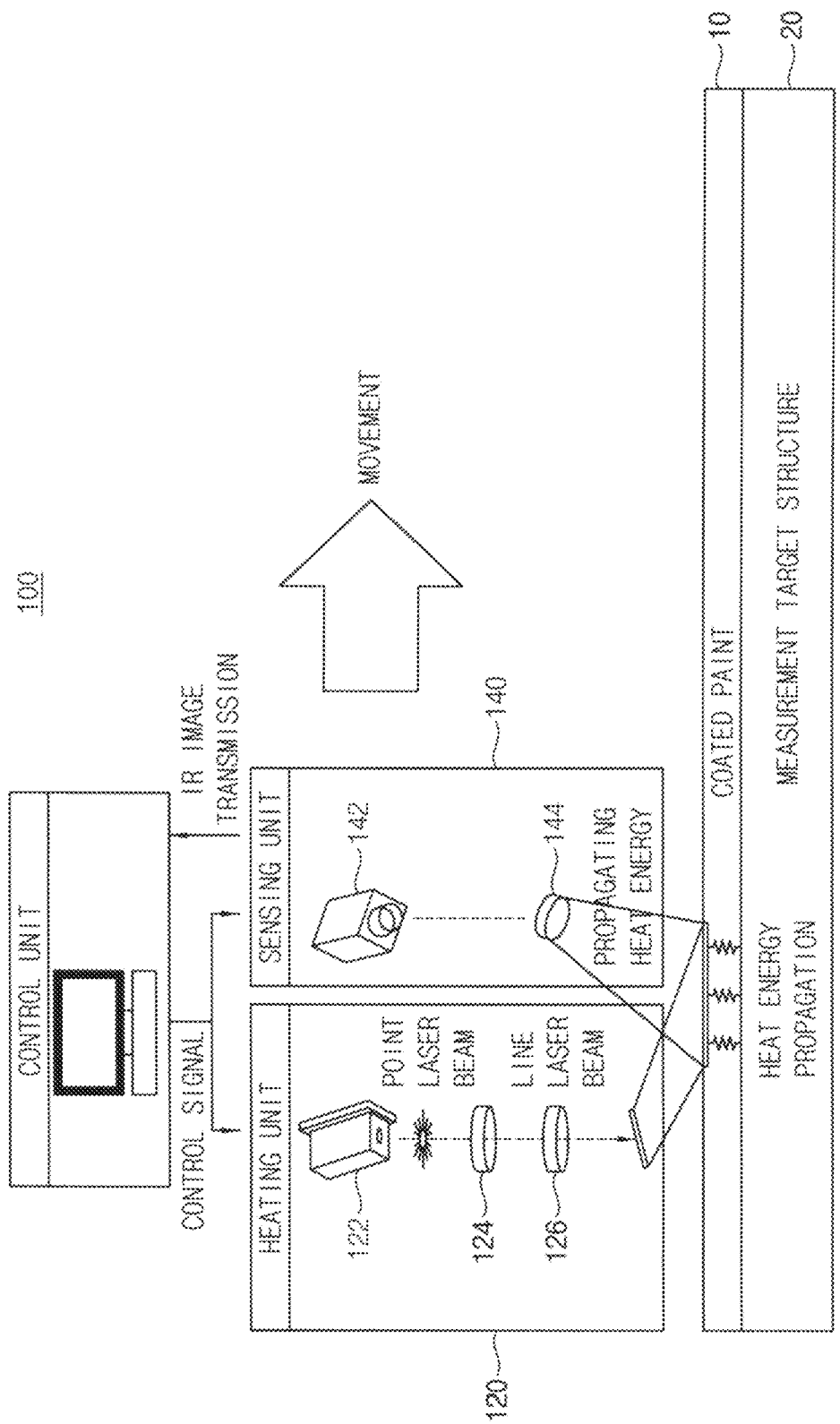
FIG. 1 is a view showing a configuration of a system for performing visualized measurement on thickness distribution of a paint film according to an embodiment of the present invention.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

For embodiments of the present invention disclosed herein, certain structural or functional descriptions are given for the purpose of illustrating the embodiments of the present invention only. Embodiments of the present invention may be realized in various forms, and should not be construed as being limited to the embodiments set forth herein.

Although any of the terms such as "first" or "second" may be used to describe various elements, the elements should not be limited by the terms. The terms are only used to distinguish one element from another.

Terms used herein are intended to describe certain embodiments only, and shall by no means limit the present invention. Unless clearly used otherwise, expressions in a singular form include a meaning of a plural form. In the present specification, the terms such as "comprising" or "including" are intended to designate the presence of characteristics, numbers, steps, operations, elements, parts or combinations thereof, and shall not be construed to preclude any possibility of presence or addition of one or more other characteristics, numbers, steps, operations, elements, parts or combinations thereof.

For embodiments of the present invention disclosed herein, certain structural or functional descriptions are given for the purpose of illustrating the embodiments of the present invention only. Embodiments of the present invention may be realized in various forms, and should not be construed as being limited to the embodiments set forth herein. In other words, since various changes and modifications can be made to the present invention, certain embodiments will be illustrated and described in detail with reference to the accompanying drawings. This, however, is by no means to limit the present invention to the certain embodiments, and shall be construed as including all modifications, equivalents, and alternatives falling within the spirit and scope of the present invention.

Hereinafter, preferred some embodiments of the present disclosure will be described in detail with reference to the accompanying drawings. Throughout the drawings, the same reference numerals are used to designate the same elements, and redundant descriptions of the same elements will be omitted.

Figure 2:
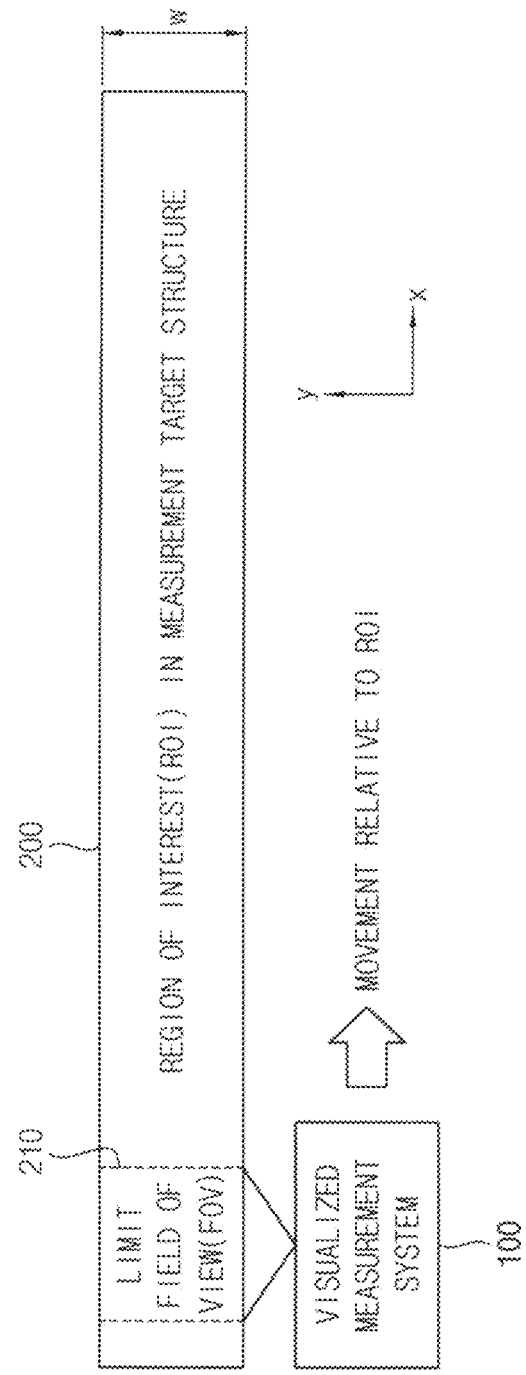
FIG. 2 is a view for describing a method of visualizing and quantifying a thickness of a paint film in a measurement target region of a measurement target structure by using the system for performing the visualized measurement on the thickness distribution of the paint film according to the embodiment of the present invention.

FIG. 1 is a view showing a configuration of a system 100 for performing visualized measurement on thickness distribution of a paint film according to an embodiment of the present invention. FIG. 2 is a view for describing a method of measuring and visualizing a thickness of a paint film 10 in a region of interest (ROI) of measurement target structures 10 and 20, that is, in a measurement target region 200 by using the visualized measurement system 100 according to the embodiment of the present invention.

Referring to FIG. 1, the system 100 for performing the visualized measurement on the thickness distribution of the paint film may include a control unit 110, a heating unit 120, and a sensing unit 140. A paint film thickness inspection target may be a structure (hereinafter, referred to as "measurement target structures 10 and 20") in which paint 10 is applied to a surface of the structure 20 to form the paint film 10. The paint film 10 may be a monolayer formed of a single type of paint or multiple layers laminated with a plurality of types of paint. A type or a size of the structure 20 is not particularly limited.

The heating unit 120 generates a laser beam to apply thermal energy to the paint film thickness inspection target. The thermal energy is propagated in the measurement target structures 10 and 20 heated by the laser beam or a light beam. The sensing unit 140 may generate a plurality of thermal images by photographing a thermal energy propagation phenomenon occurring in the measurement target structures 10 and 20. The sensing unit 140 may provide the thermal images to the control unit 110.

Operations of the heating unit 120 and the sensing unit 140 may be controlled by a control signal provided by the control unit 110. The heating unit 120, the sensing unit 140, and the control unit 110 may include a communication unit (not shown) for allowing the heating unit 120, the sensing unit 140, and the control unit 110 to communicate with each other. The communication unit may support wired communication or wireless communication.

According to the embodiment, the control unit 110 may be realized with a computer device. The computer device for the control unit 110 may be provided with programs for controlling heating and measurement operations which will be described below.

According to the embodiment, the heating unit 120 may generate a linear light beam to effectively perform the heating over a wide area. The heating unit 120 may apply the light beam while moving with respect to the measurement target structures 10 and 20. The light beam may be, for example, a laser beam generated by a laser generator or lamp light generated by a lamp device.

According to the embodiment, the heating unit 120 may include a laser generator 122 for generating a laser beam, a line beam generator 124, and a first focusing lens 126. The laser generator 122 may be, for example, a continuous wave (CW) laser. The continuous wave laser is a device for continuously generating a laser beam without being interrupted. The continuous wave laser may be substituted with various types of light sources depending on a shape of an inspection target structure or a precision degree of the inspection, etc. According to the embodiment, the laser generator 122 may generate a point laser beam according to the control signal of the control unit 110. According to another embodiment, the laser generator 122 may be a pulsed laser.

As shown in FIG. 2, the measurement target region 200 for measuring the thickness of the paint film 10 may be wide. In order to effectively heat the wide measurement target region 200, the laser beam may be converted into a linear laser beam having a predetermined length and a predetermined width by the line beam generator 124. The linear laser beam may produce thermal energy in a linear region having the predetermined length and the predetermined width in the measurement target structures 10 and 20 via the first focusing lens 126. In order to effectively transfer the thermal energy by a single motion, the length of the linear laser beam (i.e., a length in a y-axis direction in FIG. 2) may be greater than or equal to a width w of the measurement target region 200 of the measurement target structures 10 and 20.

According to the embodiment, the heating unit 120 may use a lamp device (not shown) instead of the laser generator 122 as means for heating the measurement target structures 10 and 20. The lamp device may generate linear light by using a lamp light source unit (not shown) for converting electric energy into light energy, and a light linearization unit (not shown) for collecting light generated by the lamp light source unit to convert the light such that linear light is outputted.

The linear light may be applied to the measurement target structures 10 and 20 via the first focusing lens 126. The first focusing lens 126 may adjust a focal point such that a length of the linear light is adapted to a width of the measurement target region 200. The lamp light source unit may be realized by using, for example, a halogen lamp, an LED lamp, or other various light sources. The laser generator may be advantageous for precise inspection while being disadvantageous for construction of a small-sized lightweight system, whereas the lamp light source unit may be suitable for constructing the small-sized lightweight system. An optimum light source device may be selected and used according to the inspection target. Hereinafter, an example in which the laser beam is used will be described for convenience.

The thermal energy applied to the measurement target structures 10 and 20 may be propagated through the measurement target structures 10 and 20. The sensing unit 140 may measure a phenomenon that the thermal energy applied by the heating unit 120 is propagated in the measurement target structures 10 and 20, and convert the measured phenomenon into an image. In other words, the sensing unit 140 may automatically convert measurement data related to the thermal energy propagation in the measurement target structures 10 and 20 into a thermal image. In addition, the sensing unit 140 may transmit the thermal image to the control unit 110. The control unit 110 may store the received thermal image in a storage device.

According to the embodiment, the sensing unit 140 may include a heat wave photographing unit 142 and a second focusing lens 144.

The second focusing lens 144 may adjust a focal point of the heat wave photographing unit 142 such that the heat wave photographing unit 142 precisely focuses on a surface of the measurement target structures 10 and 20.

The heat wave photographing unit 142 may be a device for photographing by using heat waves. For example, the heat wave photographing unit 142 may be a camera for expressing thermal distribution of the measurement targets 10 and 20 as an image. The heat wave photographing unit 142 may convert thermal energy distribution on the surface of the measurement target structures 10 and 20 into an image through the second focusing lens 144. The heat wave photographing unit 142 may communicate with the control unit 110. The heat wave photographing unit 142 may perform the measurement operation based on the control signal provided by the control unit 110, and transmit the image of the thermal energy distribution obtained as a result of the measurement to the control unit 110. Accordingly, the thickness of the paint film 10 may be automatically visualized.

According to the embodiment, the heat wave photographing unit 142 may be a thermal imaging camera such as an infrared (IR) camera. The infrared camera analyzes infrared rays radiated from the measurement targets 10 and 20 to express the thermal distribution as an image. Temperature distribution of the measurement targets 10 and 20 for each position may be visualized by expressing colors differently according to temperatures of the measurement targets 10 and 20.

According to another embodiment, the heat wave photographing unit 142 may be a hyperspectral camera. The hyperspectral camera may have a structure in which a spectrometer is disposed between a lens and a (infrared/visible light) camera. Unlike typical cameras, the hyperspectral camera may accept a wide wavelength band in continuous data according to a wavelength. Unlike typical (infrared/visible light) cameras, the hyperspectral camera may store multiple images according to a wavelength band even when a single image is taken. As a result, there is an advantage in that physical properties can be analyzed by analyzing distribution and size of measured signals for each wavelength.

For example, the thermal imaging camera may visualize the temperature distribution at a high resolution (e.g., 640× 512 pixels) with a wavelength band of 7.5 μm to 12 μm. The hyperspectral camera may use an infrared band (e.g., 7.5 μm to 12 μm) for the wavelength band, and visualize the thermal energy distribution according to a wavelength. The thermal imaging camera may measure the paint film thickness by using base data according to a type of paint and an inspection time, whereas the hyperspectral camera may measure the paint film thickness without the base data.

Referring to FIG. 2, the heat wave photographing unit 142 may photograph a region 210 corresponding to a field of view (FOV) of the heat wave photographing unit 142. When the measurement target region 200 of the measurement target structures 10 and 20 is wider than the field-of-view (FOV) region 210, a single shot may be insufficient. The visualized measurement system 100 may photograph an entire measurement target region 200 while moving relative to the measurement target structures 10 and 20. In this case, the relative movement indicates a case where at least one or both of the visualized measurement system 100 and the measurement target structures 10 and 20 move.

During the measurement and visualization of the thickness of the paint film 10, the visualized measurement system 100 may move to photograph the entire measurement target region 200 of the measurement target structures 10 and 20. According to the embodiment, the visualized measurement system 100 may be mounted on an unmanned aerial vehicle and moved. The visualized measurement system 100 may be mounted on a separate mechanical movement device and moved.

The heating unit 120 and the sensing unit 140 may be combined into a single body to move together with respect to the measurement target structures 10 and 20. The control unit 110 may move together with the heating unit 120 and the sensing unit 140, but not necessarily limited to the embodiment. For example, the heating unit 120 and the sensing unit 140 may be mounted on the unmanned aerial vehicle and moved together, while the control unit 110 may be separated from the heating unit 120 and the sensing unit 140 and located on the ground. In this case, the control unit 110 and the combined body of the heating unit 120 and the sensing unit 140 may be connected to each other by wireless communication. According to another embodiment, the heating unit 120, the sensing unit 140, and the control unit 110 may be mounted together on the unmanned aerial vehicle. The heating unit 120, the sensing unit 140, and the control unit 110 may be connected to each other by wired communication.

The movement between the visualized measurement system 100 and the measurement target structures 10 and 20 may be relative. The measurement target structures 10 and 20 may be in a stationary state while only the visualized measurement system 100 moves, or the visualized measurement system 100 may not move while only the measurement target structures 10 and 20 move. Alternatively, both the visualization system 100 and the measurement target structures 10 and 20 may move. Through the measurement performed during the relative movement, even when the measurement target structures 10 and 20 are large structures having wide areas, thermal energy propagation characteristics may be measured over an entire area thereof. For example, the heating unit 120 may apply a linear laser beam extending in a direction of a longitudinal axis (y-axis) to the measurement target structures 10 and 20 while moving the linear laser beam in a direction of a lateral axis (x-axis) orthogonal to the linear laser beam. In this case, the sensing unit 140 may perform scanning in the direction of the x-axis to photograph the thermal energy distribution of the measurement target structures 10 and 20 while moving together with the heating unit 120. Accordingly, the thickness of the paint film 10 in a region much wider than the FOV region 210 of the sensing unit 140 may be measured, visualized, and quantified.

According to the embodiment, such moving heating and measurement by the heating unit 120 and the sensing unit 140 may be performed in synchronization with each other. Such a synchronized operation may be performed through the control signal provided by the control unit 110 to the heating unit 120 and the sensing unit 140.

Hereinafter, a method of performing visualized measurement of thickness distribution of a paint film (hereinafter referred to as a "visualized measurement method") according to the embodiment of the present invention will be described.

The visualized measurement method may be realized by a computer program. Through an algorithm of the visualized measurement method, an image in which the thickness of the paint film 10 is visualized may be formed by using an obtained thermal image. Thermal energy propagation characteristics in the paint film 10 may vary according to physical properties of the paint film 10. A propagation time at which heat waves pass through the paint film 10 may vary according to change of the thickness of the paint film 10. Based on this point, the thickness of the paint film 10 may be measured by using a thermal image in which thermal energy distribution characteristics on surfaces of the measurement target structures 10 and 20 are recorded.

Referring to FIGS. 1 and 2, the heating unit 120 and the sensing unit 140 may be synchronized with each other to perform heating and measurement operations according to the control signal provided by the control unit 110. The heating unit 120 may generate a laser beam to apply the thermal energy to the measurement target structures 10 and 20, which are the paint film thickness inspection target. The thermal energy may be generated in the measurement target structures 10 and 20 by an applied laser beam. The thermal energy may be propagated through the paint film 10. The thermal energy may be measured by the sensing unit 140. The measured thermal energy may be recorded in a plurality of thermal images. The thickness of the paint film 10 may be visualized by analyzing the thermal images.

For the visualization of the thickness of the paint film 10, coordinate transformation may be performed on the thermal images generated by the sensing unit 140. Referring to FIG. 2, a thermal image obtained by photographing the FOV region 210 by the heat wave photographing unit 142 shows thermal energy distribution in the FOV region 210. Since the measurement target region 200 is wider than the FOV region 210 of the heat wave photographing unit 142, the visualized measurement system 100 may measure the measurement target region 200 while moving relative to the measurement target region 200. Hereinafter, as shown in FIG. 2, a case in which the measurement target structures 10 and 20 are fixed, and the visualized measurement system 100 performs the heating and measurement while moving in the direction of the x-axis will be described as an example.

The thermal images generated by the heat wave photographing unit 142 may be photographed while the heat wave photographing unit 142 moves with respect to the measurement target structures 10 and 20. The measurement target structures 10 and 20 imprinted on the thermal images are also in a dynamic state (moving state), not a static state (stationary state). For the measurement target structures 10 and 20 in the dynamic state, it is very difficult to analyze thermal energy variation tendencies with time at a predetermined position. The thermal images may be needed to be reconfigured for accurate analysis of the thermal energy variation tendencies.

The description will be given in more detail for this. The linear laser beam of the heating unit 120 may be located within the FOV region 210 of the heat wave photographing unit 142. When the measurement target structures 10 and 20 pass the FOV region 210 at a constant velocity v, surface temperatures of the measurement target structures 10 and 20 heated by the linear laser beam may be measured as a thermal image by the heat wave photographing unit 142. The thermal image may include a lateral spatial axis x, a longitudinal spatial axis y, and a time axis t. For convenience of explanation, it is assumed that the linear laser beam is parallel to the y-axis of the thermal image.

The heat wave photographing unit 142 may have a limited FOV region 210, but may move relative to the measurement target structures 10 and 20 during the measurement. Accordingly, a thermal reaction may be measured by applying the linear laser beam to the wide measurement target region 200 of the measurement target structures 10 and 20. In this case, a region to which the linear laser beam is applied is the measurement target region (ROI) 200.

The thermal images may be measured while the measurement target structures 10 and 20 and the sensing unit 140 may be continuously moving relative to each other. Therefore, it is impossible to confirm temperature variation tendencies over time according to the application of the linear laser beam at a predetermined position of the measurement target structures 10 and 20. In addition, it is difficult to confirm inspection results for the entire measurement target region 200.

According to the embodiment of the present invention to solve the above problems, a time-spatial-integrated coordinate transform (TSICT) algorithm may be used. The thermal images generated by the sensing unit 140 may be reconfigured by using the TSICT algorithm.

Figure 3:
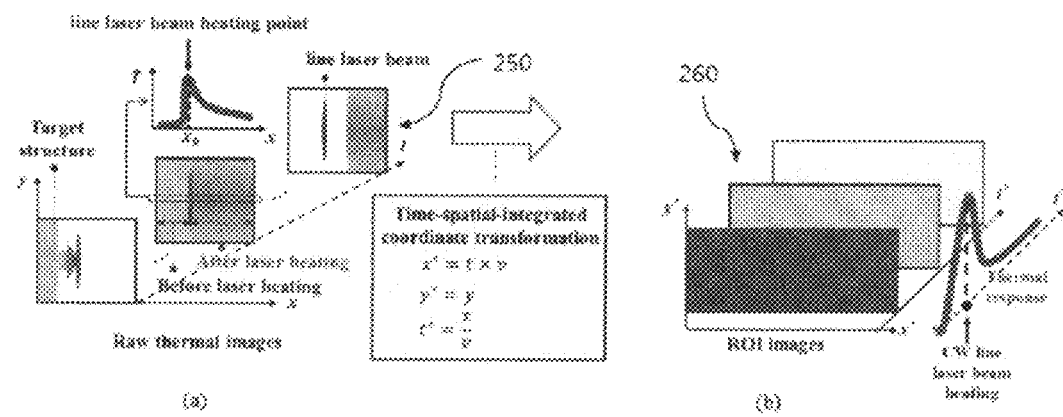
FIG. 3 is a view schematically showing a thermal image coordinate transformation step (first step), which is a part of an algorithm for visualizing and measuring a paint film thickness by using a thermal image according to the embodiment of the present invention.

FIG. 3 is a view showing a method of reconfiguring the thermal images in the dynamic state, which are photographed by the heat wave photographing unit 142, into images in the static state by using the TSICT algorithm.

Referring to FIG. 3, thermal images 250 generated by the heat wave photographing unit 142 indicate a thermal energy reaction on the measurement target structures 10 and 20 in the dynamic state. When the thermal images 250 are processed by applying the TSICT algorithm, the thermal images 250 may be converted into images representing a thermal energy reaction on the measurement target structures 10 and 20 in the static state. In other words, original thermal images 250 in the dynamic state (thermal images including an x-axis, a y-axis, and a t-axis) may be converted into time-spatial-integrated thermal images 260 (ROI images including an x*-axis, a y*-axis, and a t*-axis) by applying the TSICT algorithm. Thus, it is possible to confirm the temperature variation tendencies of specimens according to the application of the linear laser beam in view of the entire measurement target region 200, that is, entire measurement target structures 10 and 20.

The TSICT algorithm may be expressed by the following equation (1).

$$\begin{bmatrix} x^* \\ y^* \\ t^* \end{bmatrix} = \begin{bmatrix} 0 & 0 & v \\ 0 & 1 & 0 \\ 1/v & 0 & 0 \end{bmatrix} \begin{bmatrix} x \\ y \\ z \end{bmatrix} \qquad (1)$$

Here, x and y respectively denote an x-axis and a y-axis in the original thermal images 250, and t denotes a time. In addition, x* and y* respectively denote an x-axis and a y-axis in the converted thermal images. t* denotes a thermal wave propagation time. v denotes a relative velocity between the heat wave photographing unit 142 and the measurement target structures 10 and 20.

According to the equation (1), x*, y*, and t* may be substituted by x*=tv, y*=y, and t*=x/v, respectively. Through the above substitution, the measurement target structures 10 and 20 in the dynamic state may be converted into the measurement target structures 10 and 20 in the static state.

In detail, x-axis data of the thermal image 250 before the conversion indicate the temperature variation tendencies of the measurement target structures 10 and 20 over time before and after the linear laser beam is applied at a position of the linear laser beam application. Therefore, division of the data located on the x-axis of the thermal image by the relative velocity v may be designated as a time axis t* of the ROI image. Since the thermal images 250 are obtained by measuring the measurement target structures 10 and 20 moving at a predetermined speed v with respect to the heat wave photographing unit 142, positions of the measurement target structures 10 and 20 at each point of the thermal images 250 vary over time. Therefore, multiplication of data located on the time axis t of the thermal images 250 by the relative velocity v may be designated as a lateral space axis x* of the ROI image 260. The y-axis data of the thermal image 250 may be designated as a longitudinal space axis y* of the ROI images 260 without any additional coordinate transformation.

A single time-spatial-integrated thermal image obtained through the conversion using the equation (1) may be an image representing all areas where the measurement is performed, that is, the measurement target region 200. The thermal energy propagation characteristics over time may be confirmed through the single time-spatial-integrated thermal image.

Figure 4:
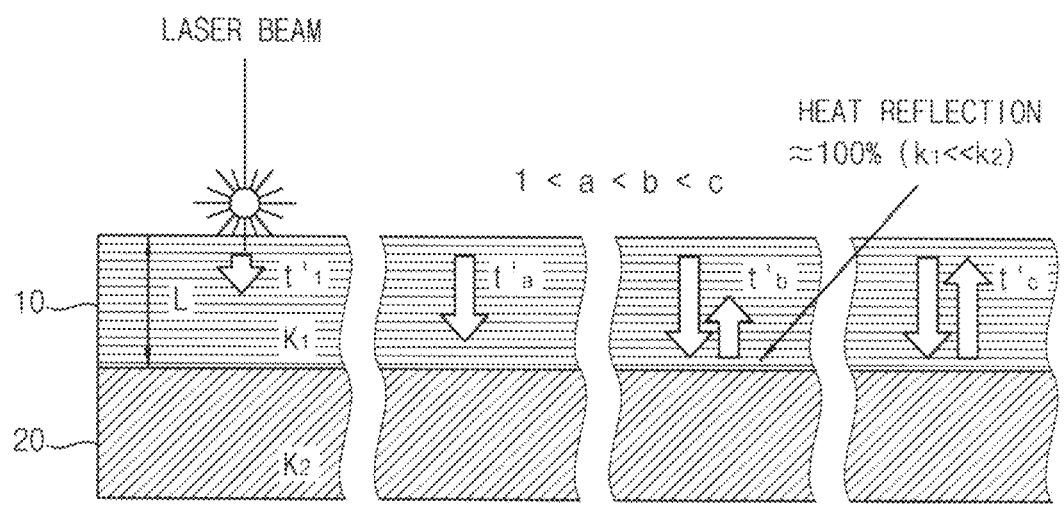
FIG. 4 is a view showing thermal energy propagation characteristics in a measurement target structure to which a linear laser beam is applied.

The time-spatial-integrated thermal image may be expressed as if a wide heat source region is heated in a pulse waveform. The thermal reaction may be expressed in a time domain t*. As shown in FIG. 4, when thermal energy of the pulse waveform is applied to the measurement target structures 10 and 20, the thermal energy may be propagated into the measurement target structures 10 and 20 in a thickness direction of the measurement target structures 10 and 20. The thermal energy propagated into the measurement target structures 10 and 20 may be reflected at a point where the physical properties of the measurement target structures 10 and 20 change, that is, at an interface between the structure 20 and the paint film 10, and propagated again toward the surface of the measurement target structures 10 and 20. The thermal energy is reflected at the interface because there is a large thermal conductivity difference between the structure 20 and the paint film 10. When thermal conductivity $k_1$ of the paint film 10 is very small in comparison with thermal conductivity $k_2$ of the structure 20 (i.e., $k_1 \ll k_2$), a thermal reflectance at the interface is close to approximately 100%.

In this case, the thermal energy reflected after the heating may be measured by the heat wave photographing unit 142. The thickness of the paint film 10 may be estimated through a measured time and an amount of the thermal energy. A time point at which maximum average temperature distribution is realized in the time-spatial-integrated thermal image may be a time at which the thermal energy reflected from the interface between the structure 20 and the paint film 10 reaches the surface of the measurement target structures 10 and 20, that is, the surface of the paint film 10. By using the time, the thickness of the paint film 10 may be estimated through a Fourier thermal conduction equation expressed by the following equation (2).

$$L = Q/kA\Delta Tt^* \qquad (2)$$

Here, L denotes the thickness of the paint film 10, Q denotes the thermal energy applied to the surface of the measurement target structures 10 and 20, k denotes the thermal conductivity of the paint film 10, A denotes a sectional area through which the thermal energy is propagated, ΔT denotes a temperature increment of the paint film 10 caused by the applied light laser beam, and t* denotes a thermal wave propagation time. In order to clearly see the thermal reaction corresponding to the thickness of the paint film 10, an appropriate value needs to be selected as t* based on the Fourier thermal conduction equation.

However, the thickness L of the paint film 10 estimated through the equation (2) may include various noise components. In particular, noises such as ambient external heat sources (e.g., solar heat or an ambient heating element) and surface reflections which are irrelevant to the thickness measurement may affect the thickness measurement. In addition, a noise may be generated by various ambient conditions (such as temperature and/or humidity conditions of ambient air). A temperature difference caused by such ambient external noisy heat sources is irrelevant to the heating performed by the linear laser beam. It may be required that thermal reactions caused by the external noisy heat sources should be removed from the integrated thermal images.

Figure 5:
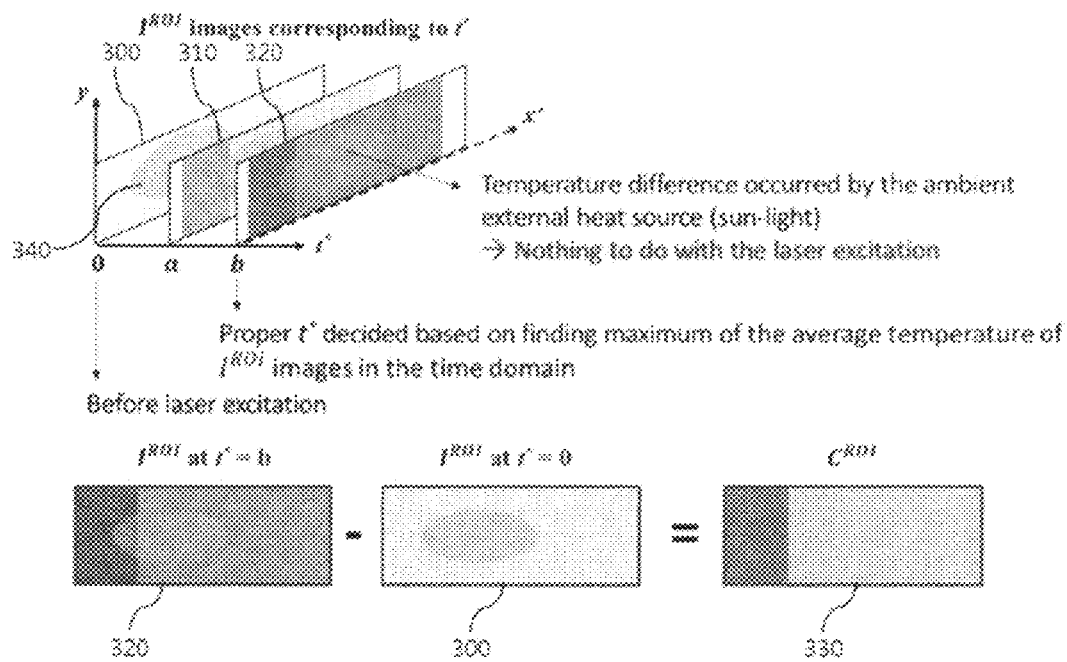
FIG. 5 is a view showing a method of removing noise components such as external heat sources and surface reflections which are irrelevant to thickness measurement from the time-spatial-integrated thermal images.

FIG. 5 is a view showing a method of more accurately measuring the thickness of the paint film 10 by removing noise components caused by the external noisy heat sources which are irrelevant to the thickness measurement through additional image and signal processing.

Referring to FIG. 5, a reference numeral 300 indicates a time-spatial-integrated thermal image obtained by photographing the measurement target region 200 immediately before applying the thermal energy through the linear laser beam, and reference numerals 310 and 320 indicate a time-spatial-integrated thermal image obtained by photographing the measurement target region 200 when the time elapses by t*=a and t*=b after applying the thermal energy (where b>a).

Inspection (thermal energy measurement) may be performed on a specific region of the measurement target structures 10 and 20 in a very short time. The external noisy heat sources that generate a noise in the thermal energy measurement may not cause a temperature variation to the measurement target structures 10 and 20 in the short time during which the inspection is performed. A first time-spatial-integrated thermal image 300 photographed before the thermal energy for performing the inspection is applied to the measurement target structures 10 and 20 may be regarded as a thermal image caused by the external noisy heat sources.

In this regard, according to the embodiment of the present invention, the time-spatial-integrated thermal image 300 photographed before applying the linear laser beam to the measurement target structures 10 and 20 may be subtracted from all remaining time-spatial-integrated thermal images 310 and 320 photographed after applying the linear laser beam to the measurement target structures 10 and 20. In detail, the first time-spatial-integrated thermal image 300 may be generated by photographing thermal images of the measurement target structures 10 and 20 immediately before applying the linear laser beam to the measurement target structures 10 and 20, and applying the TSICT algorithm. Then, while applying the linear laser beam to the measurement target structures 10 and 20, the thermal images of the measurement target structures 10 and 20 may be photographed and the TSICT algorithm may be applied by the method as described above so as to generate second time-spatial-integrated thermal images 320 of the measurement target region 200. In FIG. 5, an elliptical region indicated by '340' corresponds to a thermal reaction region caused by the external noisy heat sources. A thermal image 340 caused by the external noisy heat source may be commonly present in the first and second time-spatial-integrated thermal images 300 and 320. The first time-spatial-integrated thermal image 300 may be subtracted from the second time-spatial-integrated thermal image 320. Thus, a third time-spatial-integrated thermal image 330 obtained through the above subtraction is a corrected image which is intended to be obtained. The time-spatial-integrated thermal image 330 obtained through the above correction does not include a thermal reaction region 340 caused by the external noisy heat sources.

Figure 6:
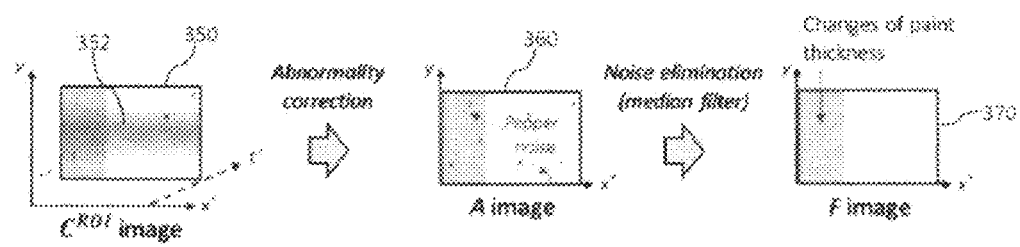
FIG. 6 is a view showing a method of removing other internal noises contained in the time-spatial-integrated thermal image.
Figure 7:
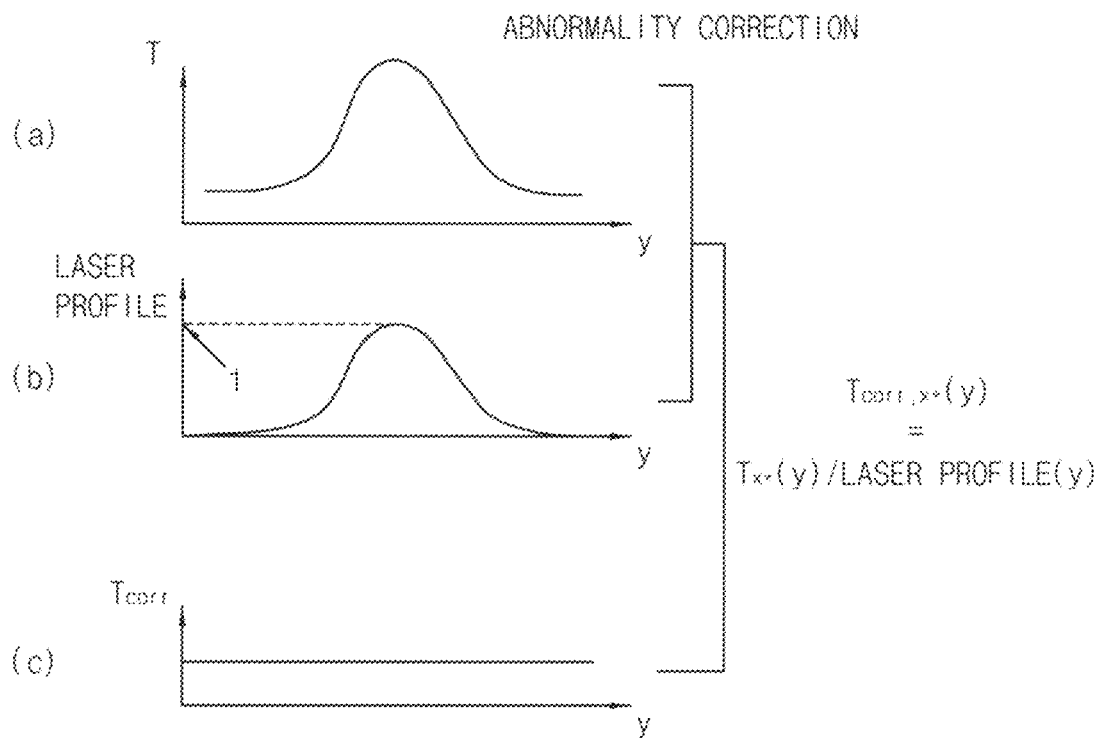
FIG. 7 is a view for describing a method of correcting abnormality shown in FIG. 6.
Figure 8:
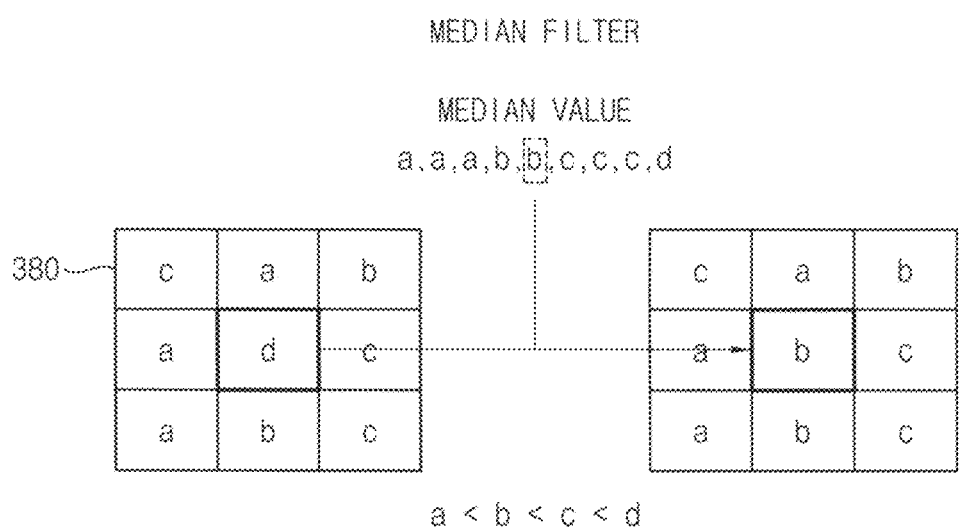
FIG. 8 is a view for describing a median filtering process shown in FIG. 6.

Meanwhile, factors of the noise may include other internal factors in addition to factors such as the external noise heat sources. Additional image correction may be performed to remove other noises that may be contained in the time-spatial-integrated thermal image 330 corrected as described above. FIG. 6 is a view showing a method of removing other internal noises contained in the time-spatial-integrated thermal image 330. FIG. 7 is a view for describing a method of correcting abnormality shown in FIG. 6, and FIG. 8 is a view for describing a median filtering process shown in FIG. 6.

Referring to FIGS. 6 and 7, other image noises as described above may be an image noise generated from the visualized measurement system 100. A first image noise may be an image noise 352 that may be generated due to non-uniform energy distribution characteristics of the linear laser beam which is a heat source generated by the heating unit 120. When a profile of the linear laser beam applied to the measurement target structures 10 and 20 is non-uniform (see FIG. 7(b)), temperature distribution induced thereby may also be abnormal (see FIG. 7(a)).

In order to correct the image noise causing the abnormal temperature distribution, each longitudinal (y-axis) data (i.e., temperature data) in the corrected time-spatial-integrated thermal image 350 may be divided by a non-uniform energy distribution profile of the linear laser beam. The longitudinal axis (y-axis) data of the time-spatial-integrated thermal image 350 obtained as described above has uniform temperature (thermal energy) distribution (see FIG. 7(c)). This is expressed by the following equation (3).

$$T_{corr,x*}(y) = T_{x*}(y)/\text{Laser Profile}(y) \quad (3)$$

Here, $T_{x*}(y)$ is longitudinal axis temperature data distribution in a $C^{ROI}$ image of FIG. 6, and $T_{corr,x*}(y)$ is the temperature data distribution corrected by dividing $T_{x*}(y)$ by a laser profile y.

A second image noise may be a random pepper noise that may be generated in the heat wave photographing unit 142. As illustrated in FIG. 6, the pepper noise may not have a particular pattern in the time-spatial-integrated thermal image 360 where the non-uniform energy distribution is corrected. However, there is a characteristic that the pepper noise does not occur on consecutive pixels. As illustrated in FIG. 8, the pepper noise may be reduced by median filtering. The median filtering where a size of a filtering mask 380 is, for example, 3×3 may eliminate the random pepper noise. For example, when four pixel data of a, b, c, and d (where a<b<c<d) exist in the filtering mask 380 having the size of 3×3, the largest value, for example, d among the a, b, c, and d may be the pepper noise. The pepper noise d may be substituted with b which is a median value of the pixel data in the filtering mask 380. A time-spatial-integrated thermal image 370 from which the pepper noise is removed may be obtained by the median filtering as described above.

The various noises may be eliminated by the various methods as above. A final time-spatial-integrated thermal image may be obtained by removing the noise as described above. In the final integrated thermal image, the thickness distribution of the paint film 10 applied to the structure 20 may be visualized and represented. A removal operation of the noise components caused by the external noisy heat sources, a removal operation of the noise component due to the non-uniform profile of the linear laser beam, and a removal operation of the pepper noise component as described above are independent from each other. Therefore, some or all of the noise component removal operations may be selectively performed, and an order of performing the operations may be arbitrary.

The thickness of the paint film 10 may be quantified by using the final time-spatial-integrated thermal image from which the noises are removed. Each pixel data of the final time-spatial-integrated thermal image is a value indicating a temperature increment of the measurement target structures 10 and 20 due to the thermal energy applied to the measurement target structures 10 and 20. However, in quantifying the thickness of the paint film 10, the thermal reaction to the applied thermal energy may vary depending on the type of paint. A result value may be corrected to quantify the thickness of the paint film 10.

Figure 9:
FIG. 9 shows photographs of inspection specimens taken to verify the present invention.

In order to verify such a phenomenon, the following test has been performed. FIG. 9 shows six inspection specimens which are used in the test. The six inspection specimens have paint films with different thicknesses (60 μm, 100 μm, 140 μm, and 180 μm). The inspection specimens have the following six different combinations of paint types and colors: epoxy-gray; ceramic-gray; urethane-red; urethane-light green; ceramic-green; and ceramic-white. Two specimens in FIG. 9(a) have different paint types (epoxy vs. ceramic) and an identical paint color (grey). Two specimens in FIG. 9(b) have an identical paint type (urethane) and different paint colors (red vs. light green). Two specimens in FIG. 9(c) have an identical paint type (ceramic) and different paint colors (green vs. white).

Figure 10:
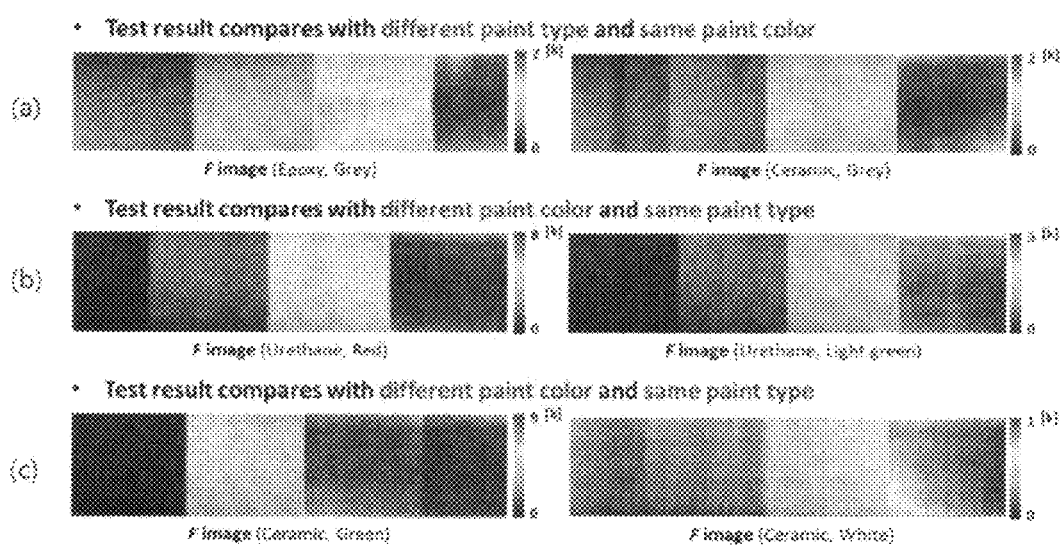
FIG. 10 shows thermal images showing results of inspection performed by using the inspection specimens of FIG. 9.

FIG. 10 shows thermal images showing results of the test. The images show that the thickness of the paint film 10 is excellently visualized. However, the temperature distribution depends on the paint type and the color of the paint. Therefore, additional analysis is required to quantify the thickness of the paint film 10.

Figure 11:
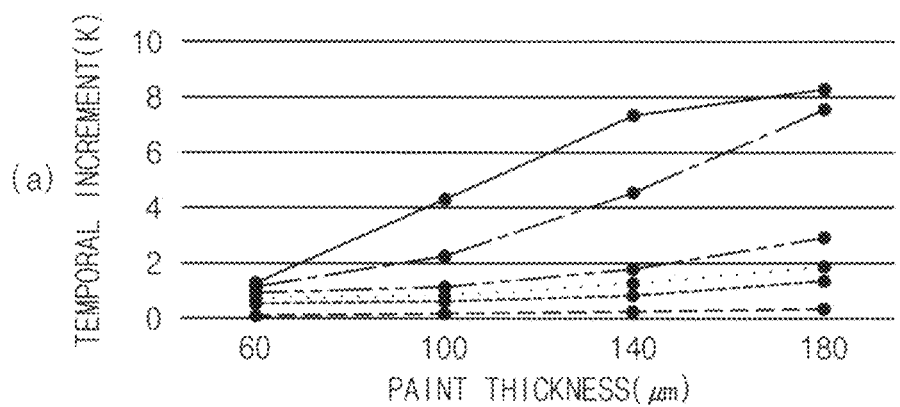
FIG. 11 shows graphs for describing quantification of the paint film thickness.
Figure 11:
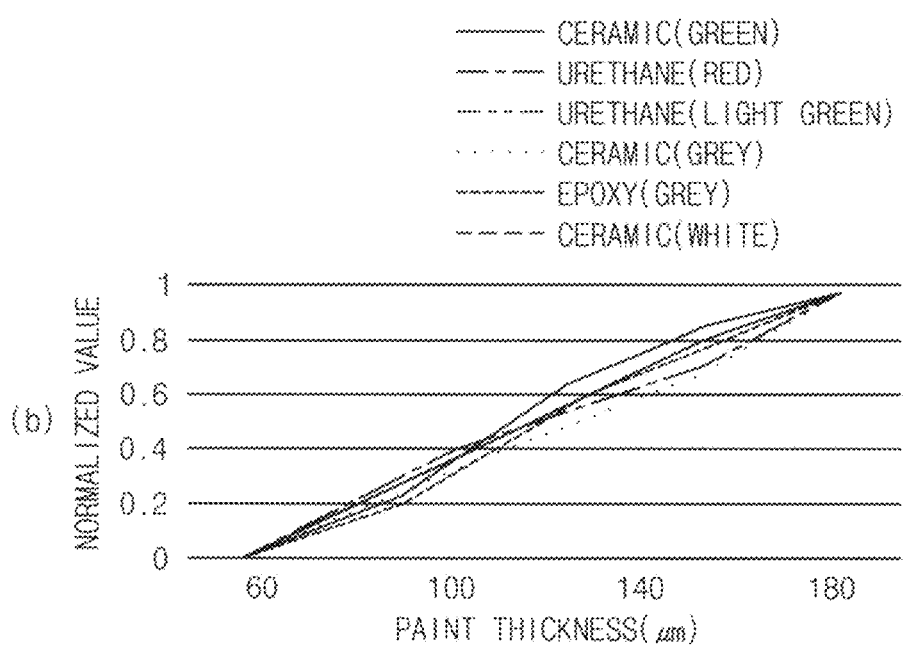

FIG. 11 is a graph for describing quantification of the paint film thickness. Referring to FIG. 11, FIG. 11(a) is a graph showing that increase in temperature in the measurement target region 200 varies depending on the type and a thickness of the paint when the thermal energy is applied to the measurement target structures 10 and 20. When the color of the paint is changed, a ratio of reflection and absorption of light at the surface of the paint film 10 varies. The present invention produces the thermal energy applied to the measurement target structures 10 and 20 in an optical manner. Therefore, an amount of the thermal energy generated in the measurement target structures 10 and 20 may vary depending on the color of the paint film 10.

According to the embodiment of the present invention, the color of the paint may be converted into a gray scale (level), and each pixel data value of the final time-spatial-integrated thermal image may be divided again by a converted value. Accordingly, a normalized pixel data value corresponding to the thickness of the paint film 10 may be obtained. FIG. 11(b) is a graph showing the normalized pixel data value obtained based on the gray scale. As described above, the difference in light reflection/absorption ratio due to the color of the paint can be minimized through the normalization using the gray scale.

In addition, a heat propagation speed within the measurement target structures 10 and 20 may vary depending on the thermal conductivity of the paint film 10. When the type of the paint is changed, the thermal conductivity of the paint film 10 generally varies. In FIG. 11, the thermal conductivities of ceramic, urethane, and epoxy are denoted as A, B, and C, respectively. When each pixel data value of the final time-spatial-integrated thermal image is divided by the thermal conductivity, a normalized value with respect to the thickness of the paint film 10 may be obtained based on the thermal conductivity of the paint. The thickness of the paint film 10 may be quantified very excellently by using the normalization scheme as described above.

The visualized measurement system 100 may be lightweight and small-sized. According to the embodiment, the visualized measurement system 100 may be mounted in various industrial robot devices for use. The industrial robot devices may be mobile or stationary devices. FIG. 12(A) is a view showing an example in which the visualized measurement system 100 is mounted on a stationary robot arm 400. For example, the visualized measurement system 100 mounted in a robot device such as the robot arm 400 may be introduced into production facility processes in various industrial fields such as automobiles, aviation, and vessels to automatically evaluate painting quality of a steel structure. If the visualized measurement system 100 is mounted on the robot arm 400, three-axis precision control of the visualized measurement system 100 may be performed on an inspection target position, so that utilization and inspection precision of the visualized measurement system 100 can be enhanced.

According to the embodiment, the visualized measurement system 100 may be mounted on an unmanned aerial vehicle such as a drone 450. FIG. 12(B) is a view showing an example in which the visualized measurement system 100 is mounted on the drone 450 according to the embodiment of the present invention.

Figure 12:
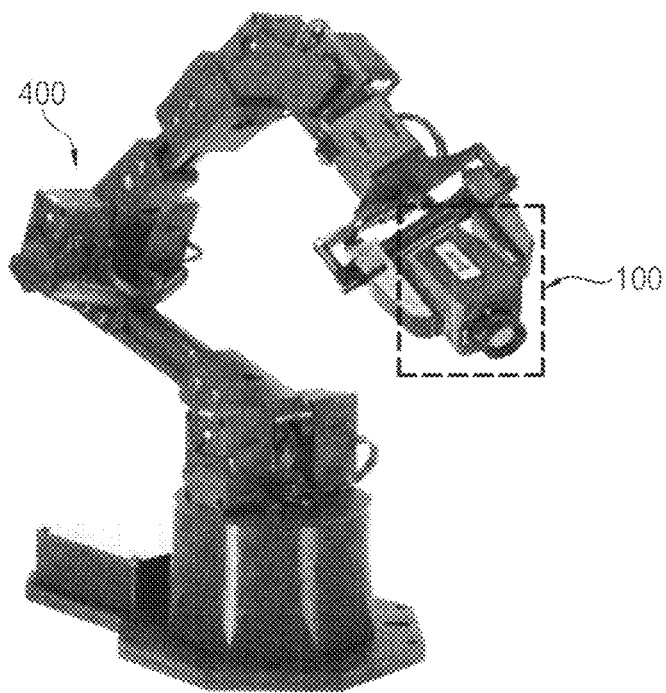
FIG. 12 is views showing examples in which a visualized measurement system is mounted on a robot arm and a drone, respectively, according to the embodiment of the present invention.
Figure 12:
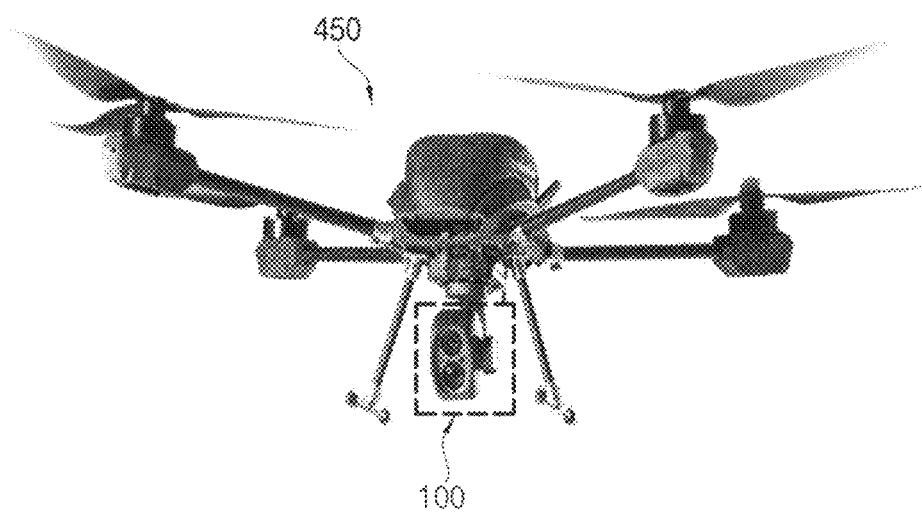
Figure 13:
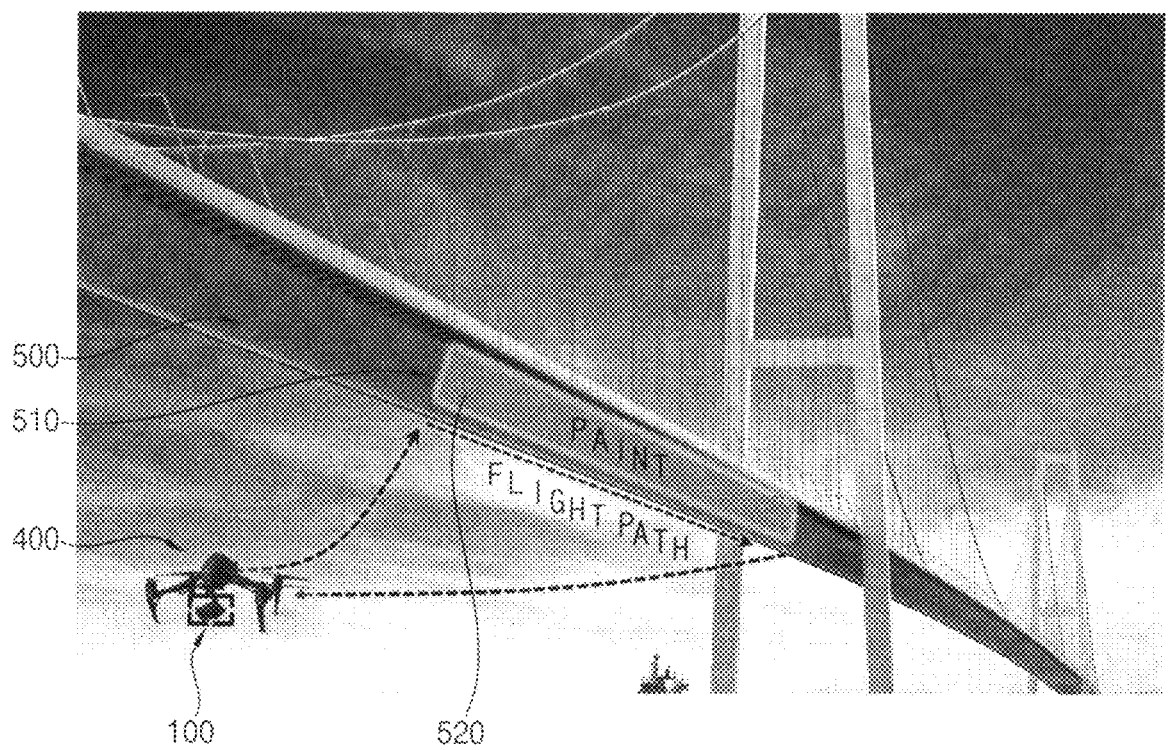
FIG. 13 is a view illustrating the visualized measurement of the thickness distribution of the paint film applied to a bridge structure by using the visualized measurement system mounted on the drone.

Referring to FIG. 12, the visualized measurement system 100 may be mounted on the drone 450 by using a support device such as a gimbal. The gimbal allows the visualized measurement system 100 to rotate about axes in front, rear, left, and right directions such that the visualized measurement system 100 may be maintained in an upright state regardless of fluctuations of the drone 450 floating in a space. A gimbal device minimizes degradation of image quality of the photographed image due to shaking by blocking vibrations, generated from the drone 450 during flight, from being transmitted to the visualized measurement system 100, and allows the visualized measurement system 100 to perform the measurement operation in the upright state regardless of inclination of a flight posture of the drone 450. FIG. 13 is a view illustrating the visualized measurement of the thickness distribution of the paint film applied to a bridge structure by using the visualized measurement system 100 mounted on the drone 450.

First, a user may input position information on a region 510 in which the visualized measurement is to be performed to the control unit 110 of the visualized measurement system 100. The position information of a measurement target region 510 inputted to the control unit 110 may be shared with a control unit of the drone 450 so as to be used for flight control of the drone 450. The drone 450 may fly based on the position information to approach a starting point of the measurement target region 510. The drone 450 may fly to an end point of the measurement target region 510 while maintaining a predetermined interval with the measurement target region 510. A separation distance between the visualized measurement system 100 and the measurement target region 510 may be, for example, suitably about 200 mm to 300 mm. In a flight process, the heating unit 120 applies the thermal energy to the measurement target region 510, and the sensing unit 140 photographs a thermal energy propagation phenomenon in the measurement target region 510 to generate a plurality of thermal images. The thermal images may be provided to the control unit 110. The control unit 110 may perform the visualized measurement on thickness distribution of the paint film 520 applied to the measurement target region 510 by performing processing on the thermal images as described above.

According to the present invention, the method and apparatus for performing the visualized measurement on the thickness distribution of the paint film as described above may visualize and quantify the thickness distribution of the paint film by applying the heat waves to the measurement target structures 10 and 20 and optically photographing the heat waves reflected therefrom. In addition, resolution of thickness quantification may be increased (e.g., 40 μm or less). For example, the visualized measurement system 100 may be mounted on an aerial device such as a drone to perform the measurement operation while performing relative flight movement with respect to the measurement target structures 10 and 20. Therefore, a visualized measurement operation may be performed in a non-contact manner in a state in which a visualized measurement apparatus does not directly make contact with the paint film. In addition, a speed of the visualized measurement operation is very rapid, so that total measurement can be efficiently performed on the entire measurement target structures without performing a conventional sample inspection scheme.

The present invention is applicable to both a wet paint film (paint film which is not dried) and a dry paint film (paint film which is dried). The reason is that a temperature variation of the paint film according to the thickness of the paint film after applying a heat source shows a tendency according to the equation (2) for both the wet paint film and the dry paint film, if the thermal conductivity of the paint film does not change over time during the inspection. The thermal conductivity of the paint film may vary depending on whether the paint film is the wet paint film or the dry paint film. However, since the inspection time is very short, the variation in the thermal conductivity during the inspection time can be ignored. Although a conventional paint film thickness measurement device can measure only the dry paint film, the present invention is advantageous in that the wet paint film can be measured in addition to the dry paint film.

According to various embodiments of the present invention, the method described above may be realized in a form of program instructions executable through various computer devices and recorded in a computer-readable medium. The computer-readable medium may include program instructions, data files, data structures, and the like, alone or in combination. The program instructions recorded in the medium may be those specially designed and configured for the embodiments, or may be widely known and available to those skilled in the art of computer software. Examples of the computer-readable medium include: magnetic media such as hard disks, floppy disks, and magnetic tapes; optical media such as CD-ROMs and DVDs; magneto-optical media such as floptical disks; and hardware devices specifically configured to store and execute program instructions, such as ROMs, RAMs, and flash memory. Examples of the program instructions include machine language codes such as those generated by a compiler, as well as high-level language codes executable by a computer by using an interpreter or the like. The hardware devices described above may be configured to operate as one or more software modules to execute the operations of the embodiments, and vice versa.

As described above, the present invention can be applied to various application fields such as paint film thickness management of large infrastructure facilities, paint film thickness management in manufacturing a vessel and an aircraft, and thickness management of outer coating of electronic products.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A method of performing visualized measurement on thickness distribution of a paint film of a structure coated with paint (hereinafter referred to as "measurement target structure"), the method comprising:
   heating a measurement target region by a heating unit that applies a light beam while moving relative to the measurement target region of the measurement target structure;
   generating, by a sensing unit moving together with the heating unit, a plurality of thermal images related to a phenomenon in which thermal energy is propagated in the measurement target region by scanning and photographing the heated measurement target region; and
   converting the thermal images in a dynamic state into time-spatial-integrated thermal images in a static state by performing coordinate transformation according to a time-spatial-integrated coordinate transformation (TSICT) algorithm.

2. The method of claim 1, further comprising measuring a thickness of the paint film by using the time-spatial-integrated thermal images based on a phenomenon that a propagation time at which the thermal energy caused by the light beam passes through the paint film varies according to the thickness of the paint film.

3. The method of claim 1, wherein the TSICT algorithm performs time-spatial-integrated coordinate transformation (TSICT) by applying $x^*=tv$, $y^*=y$, and $t^*=x/v$, in which x and y respectively denote an x-axis and a y-axis in the thermal images, t denotes a time, $x^*$ and $y^*$ respectively denote an x-axis and a y-axis in the time-spatial-integrated thermal images, $t^*$ denotes a thermal wave propagation time, and v denotes a relative velocity between the measurement target structure and the sensing unit.

4. The method of claim 3, wherein a value of the thermal wave propagation time $t^*$ is determined such that a time point at which maximum average temperature distribution is realized in the time-spatial-integrated thermal images comes to be equal to a time at which the thermal energy reflected from an interface between the structure and the paint film reaches a surface of the measurement target structure.

5. The method of claim 1, wherein a thickness of the paint film is calculated by using a Fourier thermal conduction equation $L=Q/kA\Delta Tt^*$, in which $\Delta T$ denotes a temperature increment of the paint film caused by the applied light beam, k denotes thermal conductivity of the paint film, L denotes the thickness of the paint film, Q denotes the thermal energy applied to the measurement target structure, A denotes a sectional area through which the thermal energy is propagated, and $t^*$ denotes a thermal wave propagation time.

6. The method of claim 1, further comprising generating a pre-heating time-spatial-integrated thermal image of the measurement target region by performing the generating step and the converting step on the measurement target structure before applying the light beam to the measurement target structure; and generating a corrected time-spatial-integrated thermal image from which a noise component caused by an external noisy heat source is removed by subtracting the pre-heating time-spatial-integrated thermal image from the time-spatial-integrated thermal image generated by the converting step.

7. The method of claim 6, wherein the heating step includes applying a linear light beam to the measurement target region by converting an arbitrary light beam into the linear light beam, and
   the method further comprises removing an image noise which causes abnormal temperature distribution by dividing each longitudinal axis (y-axis) data in the corrected time-spatial-integrated thermal images by a non-uniform energy distribution profile of the linear light beam.

8. The method of claim 1, wherein the heating step includes applying a linear light beam to the measurement target region by converting an arbitrary light beam into the linear light beam.

9. The method of claim 8, further comprising removing an image noise which causes abnormal temperature distribution by dividing each longitudinal axis (y-axis) data in the time-spatial-integrated thermal image, which is generated in the converting step, by a non-uniform energy distribution profile of the linear light beam.

10. The method of claim 1, further comprising removing a random pepper noise component generated in a heat wave photographing unit of the sensing unit by performing median filtering with a median filtering mask on the time-spatial-integrated thermal image generated in the converting step.

11. The method of claim 1, further comprising generating normalized pixel data based on a gray scale by converting a color of the paint into the gray scale and dividing each pixel data value of the time-spatial-integrated thermal images generated in the converting step by the gray scale.

12. The method of claim 1, further comprising generating normalized pixel data based on thermal conductivity of the paint by dividing each pixel data value of the time-spatial-integrated thermal image generated in the converting step by the thermal conductivity of the paint.

13. The method of claim 1, wherein the method is applicable to both a wet paint film where the paint film is not dried and a dry paint film where the paint film is dried.

14. The method of claim 1, wherein the heating step and the generating step are performed while a drone flies in parallel with the measurement target region of the measurement target structure in a state in which at least the heating unit and the sensing unit are combined into a single body and mounted on the drone.

15. An apparatus for performing visualized measurement on thickness distribution of a paint film of a structure coated with paint (hereinafter referred to as "measurement target structure"), the apparatus comprising:
   a heating unit configured to generate a light beam to apply thermal energy to a measurement target region of the measurement target structure while moving relative to the measurement target structure;
   a sensing unit configured to generate a plurality of thermal images related to a phenomenon in which the thermal energy is propagated by photographing the measurement target region of the measurement target structure to which the thermal energy is applied while moving together with the heating unit; and
   a control unit configured to perform a function of controlling a heating operation of the heating unit and a photographing operation of the sensing unit and receiving the thermal images from the sensing unit to store the thermal images, and a function of converting the thermal images in a dynamic state into time-spatial-integrated thermal images in a static state by performing coordinate transformation based on a time-spatial-integrated coordinate transformation (TSICT) algorithm.

16. The apparatus of claim 15, wherein the heating unit includes: a laser generator configured to continuously generate a laser beam; a line beam generator configured to convert a point laser beam generated by the laser generator into a linear laser beam; and a first focusing lens configured to adjust a focal point such that a length of the linear laser beam emitted from the line beam generator is adapted to a width of the measurement target region.

17. The apparatus of claim 15, wherein the heating unit includes: a lamp light source unit configured to convert electric energy into light energy; a light linearization unit configured to collect light generated by the lamp light source unit to convert the light such that linear light is outputted; and a first focusing lens configured to adjust a focal point such that a length of the linear light emitted from the light linearization unit is adapted to a width of the measurement target region.

18. The apparatus of claim 15, wherein the sensing unit includes: a heat wave photographing unit configured to photograph a measurement target to generate a thermal image corresponding to thermal distribution in the measurement target region; and a second focusing lens configured to adjust a focal point of the heat wave photographing unit such that the heat wave photographing unit precisely focuses on the measurement target region.

19. The apparatus of claim 18, wherein the heat wave photographing unit is any one of a thermal imaging camera and a hyperspectral camera.

20. The apparatus of claim 15, wherein the apparatus measures a thickness of the paint film by using a thermal image in which thermal energy distribution characteristics in the measurement target region of the measurement target structure are recorded based on a phenomenon that a propagation time at which the thermal energy passes through the paint film varies according to the thickness of the paint film.

21. The apparatus of claim 15, wherein a thickness of the paint film is calculated by using a Fourier thermal conduction equation $L=Q/kA\Delta Tt^*$, in which $\Delta T$ denotes a temperature increment of the paint film caused by an applied light beam, k denotes thermal conductivity of the paint film, L denotes the thickness of the paint film, Q denotes the thermal energy applied to the measurement target structure, A denotes a sectional area through which the thermal energy is propagated, and $t^*$ denotes a thermal wave propagation time.

22. The apparatus of claim 15, wherein the control unit is configured to further perform a function of controlling to photograph the measurement target region of the measurement target structure before applying the light beam to the measurement target structure and to generate a pre-heating time-spatial-integrated thermal image of the measurement target region by converting a plurality of thermal images in a dynamic state, which are generated by the photographing, into time-spatial-integrated thermal images in a static state, and a function of generating a corrected time-spatial-integrated thermal image from which a noise component caused by an external noisy heat source is removed by subtracting the pre-heating time-spatial-integrated thermal image from the converted time-spatial-integrated thermal image in the static state.

23. The apparatus of claim 22, wherein the light beam is a linear light beam, and the control unit is configured to further perform a function of removing an image noise which causes abnormal temperature distribution by dividing each longitudinal axis (y-axis) data in the corrected time-spatial-integrated thermal images by a non-uniform energy distribution profile of the linear light beam.

24. The apparatus of claim 15, further comprising a drone equipped with at least the heating unit and the sensing unit and configured to approach the measurement target region of the measurement target structure and fly in parallel with the measurement target region.

* * * * *